United States Patent
Li et al.

(10) Patent No.: US 9,390,603 B2
(45) Date of Patent: Jul. 12, 2016

(54) DUAL EAS-RFID SECURITY TAG

(71) Applicant: Checkpoint Systems, Inc., Thorofare, NJ (US)

(72) Inventors: Morui Li, West Deptford, NJ (US); Richard A. Howe, II, Mantua, NJ (US)

(73) Assignee: CHECKPOINT SYSTEMS, INC.

( * ) Notice: Subject to any disclaimer, the term of this patent is extended or adjusted under 35 U.S.C. 154(b) by 0 days.

(21) Appl. No.: 14/495,279

(22) Filed: Sep. 24, 2014

(65) Prior Publication Data

US 2016/0086465 A1    Mar. 24, 2016

(51) Int. Cl.
*G06K 19/077* (2006.01)
*G08B 13/24* (2006.01)

(52) U.S. Cl.
CPC ........ *G08B 13/2448* (2013.01); *G08B 13/2431* (2013.01); *G08B 13/2437* (2013.01); *G06K 19/07769* (2013.01)

(58) Field of Classification Search
CPC ....................... G08B 13/2448; G06K 19/17769
See application file for complete search history.

(56) References Cited

U.S. PATENT DOCUMENTS

| | | | |
|---|---|---|---|
| 5,602,556 A * | 2/1997 | Bowers | H01Q 7/04 340/572.7 |
| 5,939,984 A | 8/1999 | Brady et al. | |
| 6,154,137 A | 11/2000 | Goff et al. | |
| 7,109,867 B2 | 9/2006 | Forster | |
| 7,804,407 B2 | 9/2010 | Copeland | |
| 7,804,410 B2 | 9/2010 | Copeland | |
| 7,804,411 B2 | 9/2010 | Copeland | |
| 7,812,729 B2 | 10/2010 | Copeland | |
| 7,986,241 B2 * | 7/2011 | Copeland | G08B 13/2408 235/436 |
| 8,026,818 B2 | 9/2011 | Cote et al. | |
| 8,093,996 B2 | 1/2012 | Heurtier | |
| 8,358,209 B2 * | 1/2013 | Shafer | G08B 13/2448 235/375 |
| 8,633,821 B2 | 1/2014 | Forster | |
| 8,711,046 B2 * | 4/2014 | Copeland | H01Q 1/2225 340/572.7 |
| 2004/0233042 A1 | 11/2004 | Piccoli et al. | |
| 2010/0001079 A1* | 1/2010 | Martin | G06K 19/07749 235/492 |

FOREIGN PATENT DOCUMENTS

| | | |
|---|---|---|
| EP | 2096582 | 9/2009 |
| FR | 2901041 | 11/2007 |

OTHER PUBLICATIONS

Corresponding European Search Report for EP 15186643 dated Feb. 15, 2016.

* cited by examiner

*Primary Examiner* — Van Trieu
(74) *Attorney, Agent, or Firm* — The Belles Group, P.C.

(57) ABSTRACT

A dual EAS-RFID tag. In one embodiment, the invention can be a tag comprising a substrate having a first surface and a second surface opposite the first surface; an electronic article surveillance (EAS) element comprising an EAS antenna, the EAS antenna on the first surface of the substrate; and a radio frequency identification (RFID) element, the RFID element comprising: a far field antenna on the second surface of the substrate, the far field antenna comprising a first pole portion, a second pole portion, and a connecting portion connecting the first pole portion and the second pole portion; a near field loop antenna on the second surface of the substrate, and an integrated circuit operably coupled to the near field loop antenna; wherein the far field antenna, the near field loop antenna, and the EAS element are located on the substrate so as to be physically isolated from one another.

20 Claims, 10 Drawing Sheets

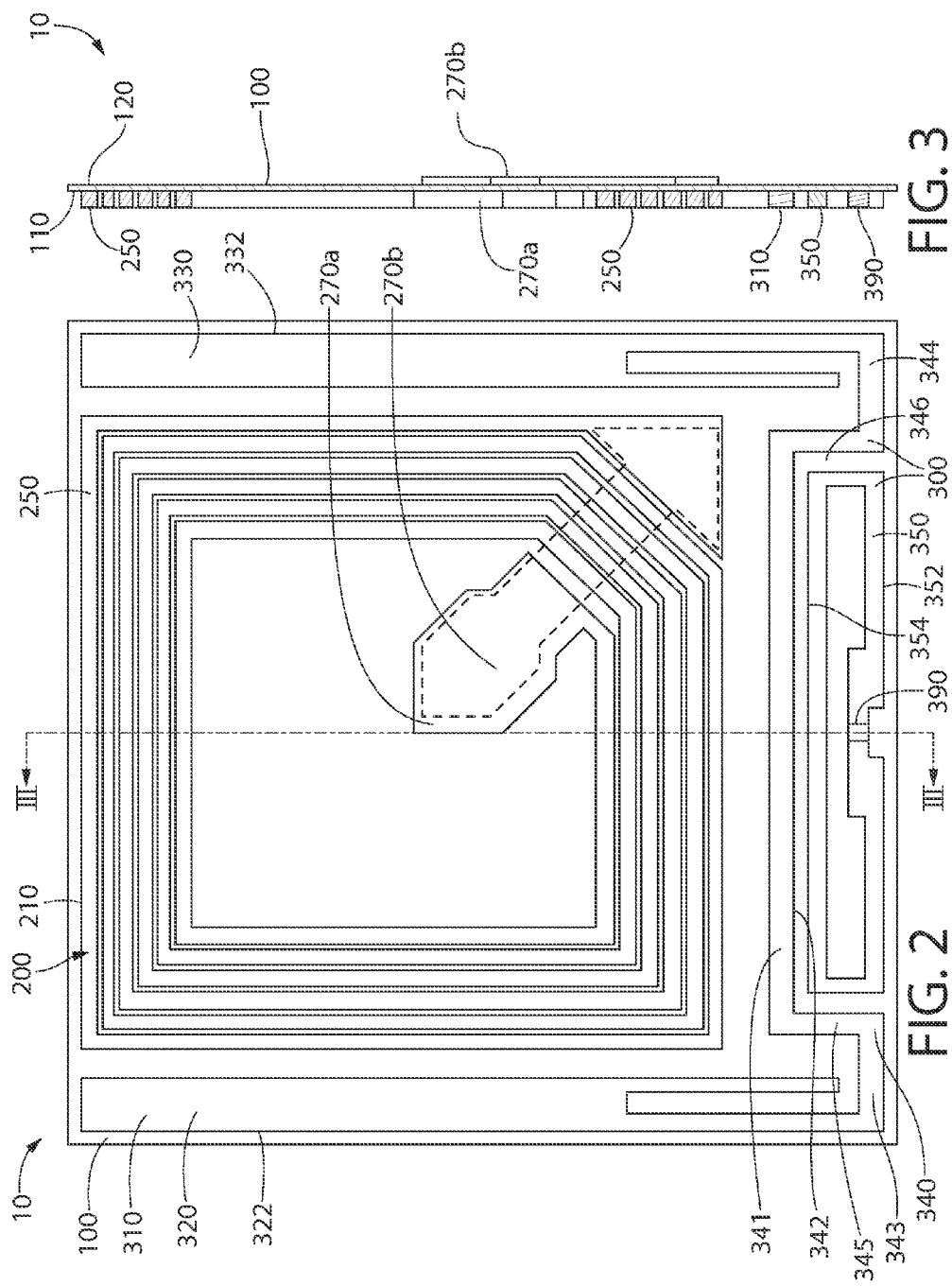

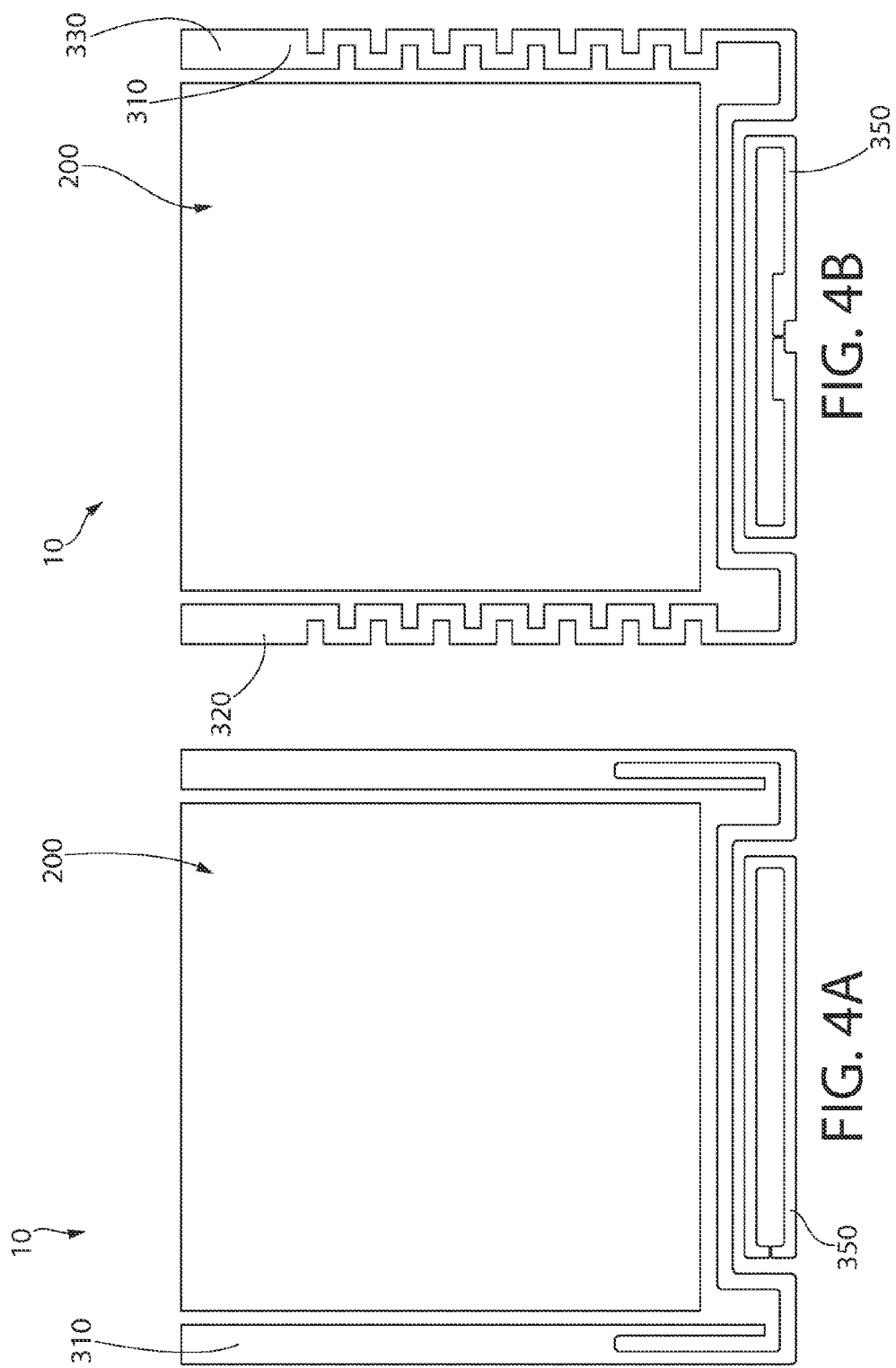

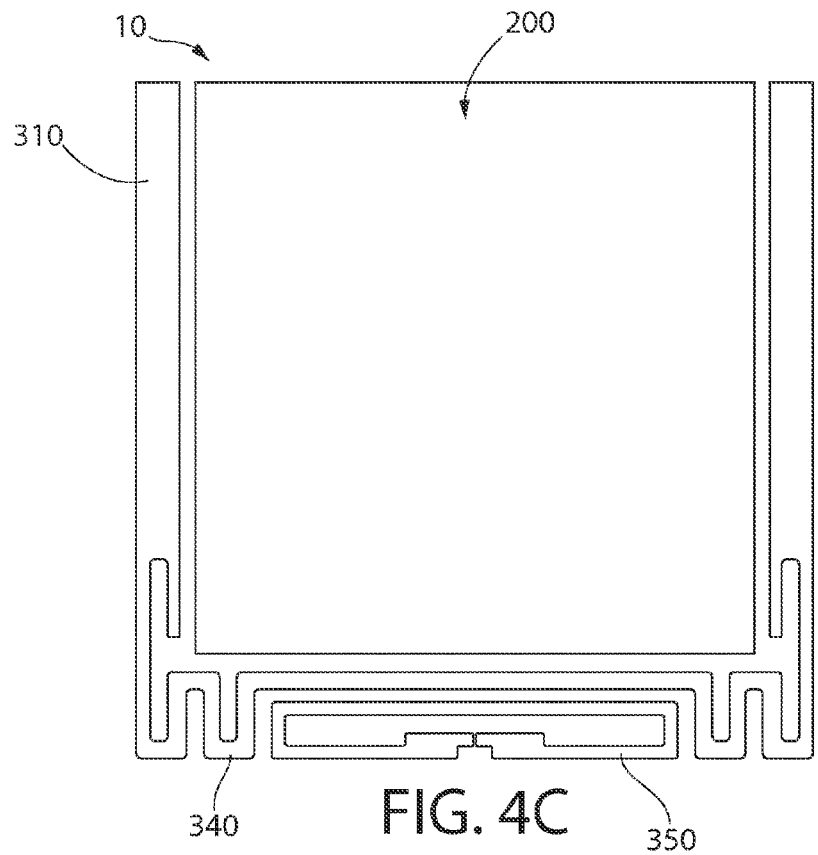
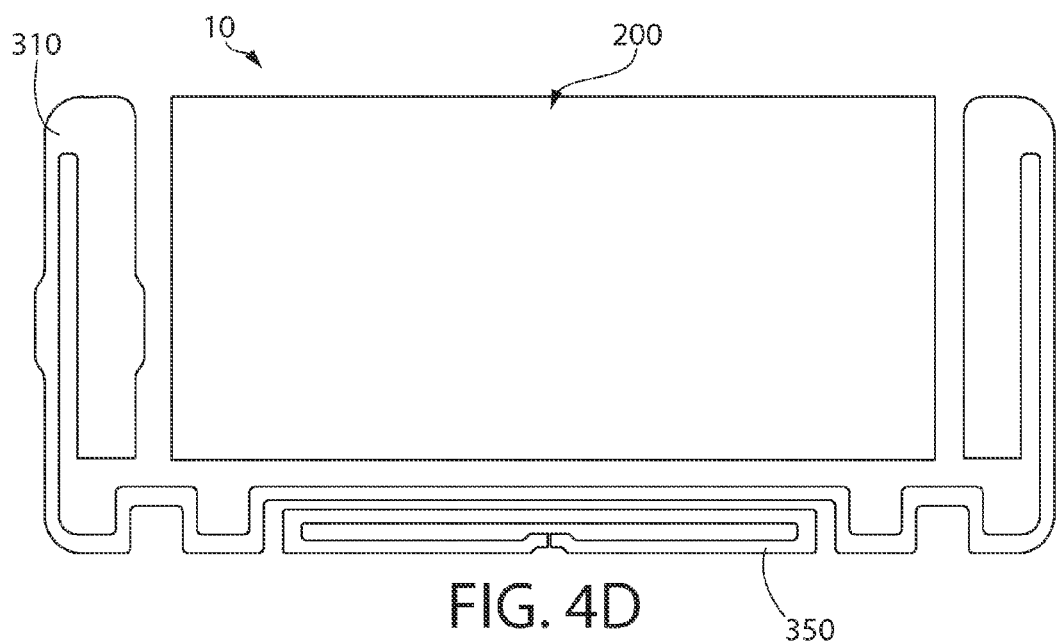

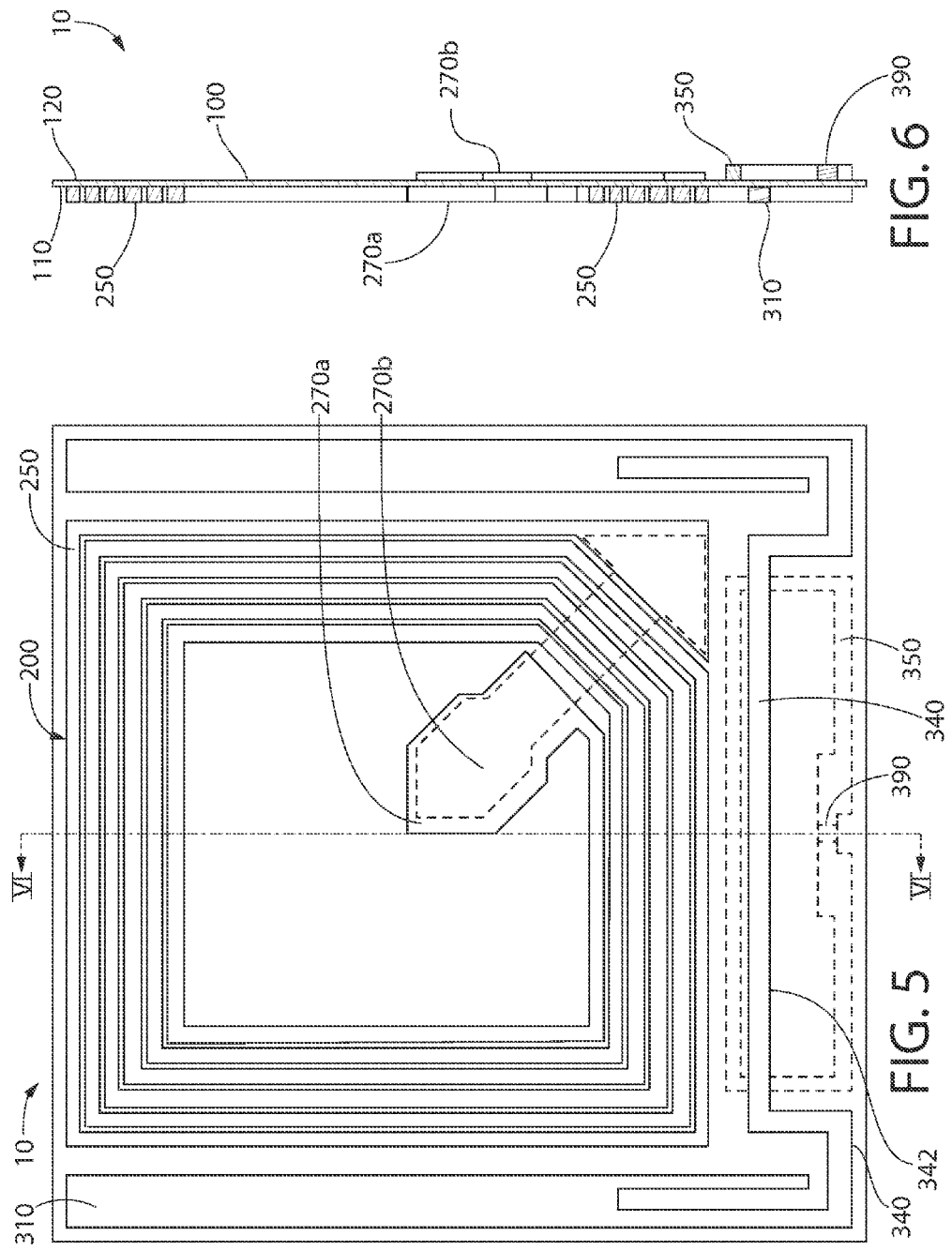

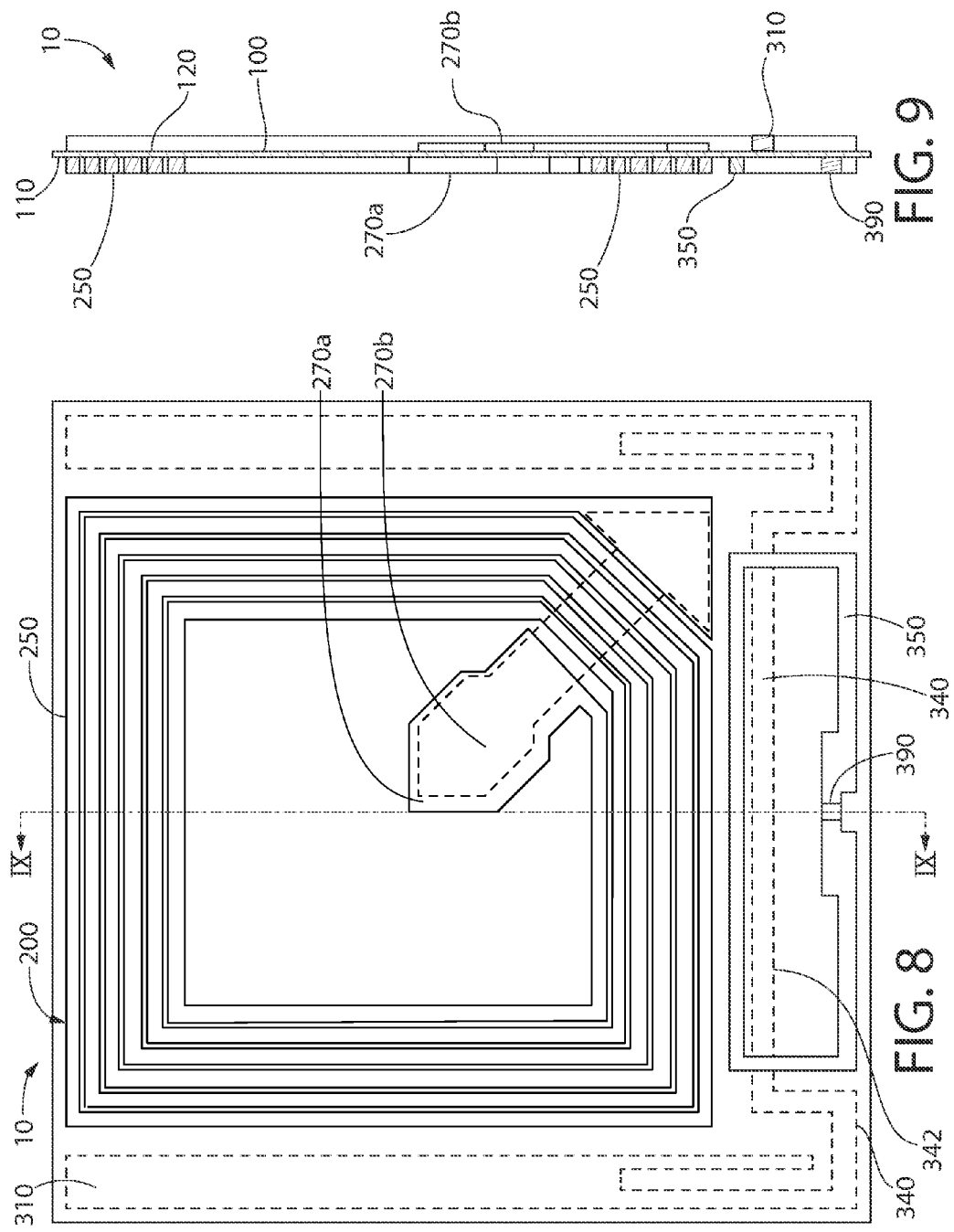

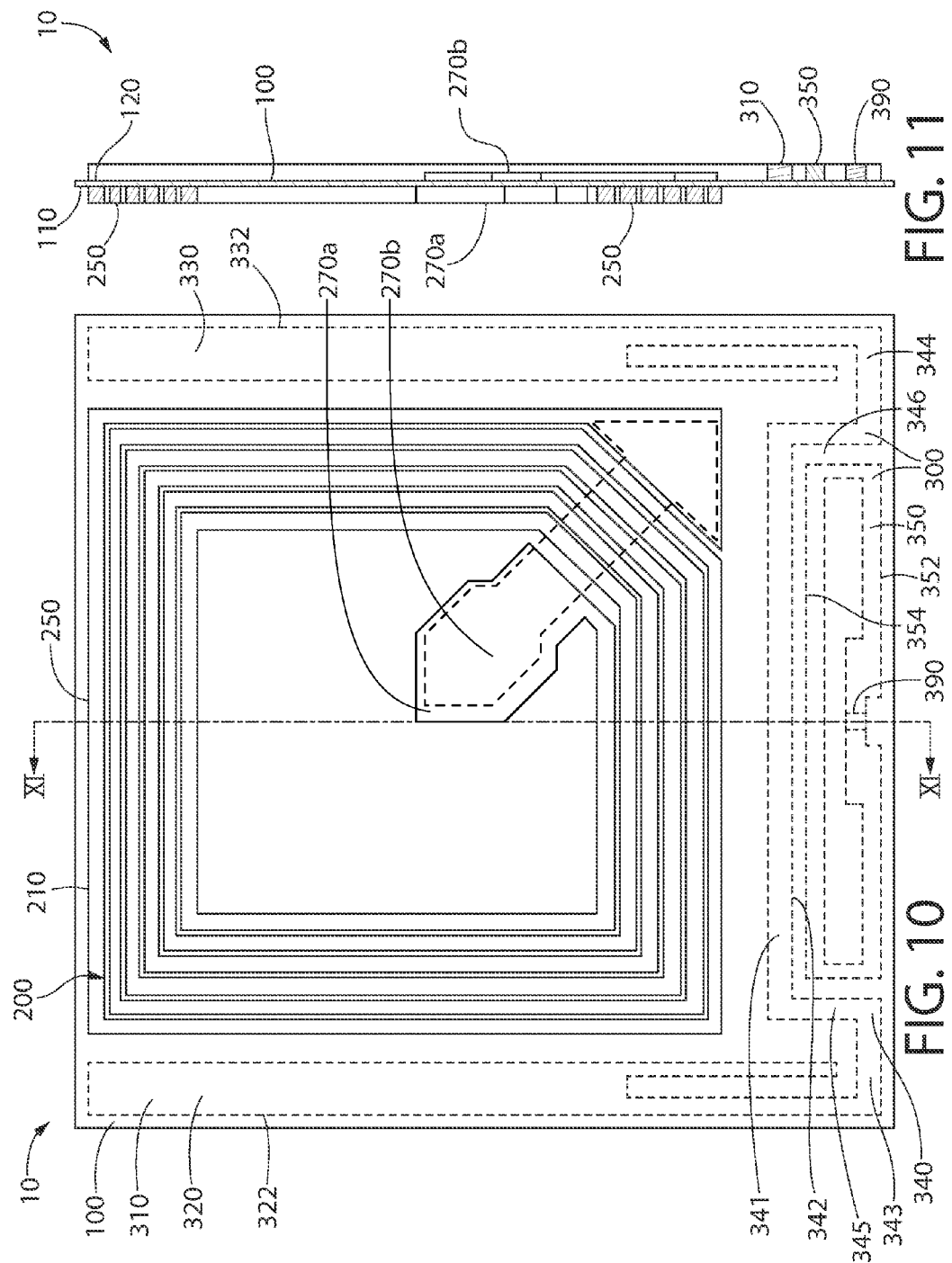

DUAL EAS-RFID SECURITY TAG

BACKGROUND

Tracking or detecting the presence or removal of retail items from an inventory or retail establishment comes under the venue of electronic article surveillance (EAS) and radio frequency identification (RFID). EAS or RFID detection is typically achieved by applying an EAS or RFID element as part of a security tag to an item or its packaging. When the security tag is exposed to a predetermined electromagnetic field, such as those generated by gates at a retail establishment exit, the tags activate to enable an alert and/or supply data to a receiver or other detector.

It has become desirable to include an EAS and RFID element on, or in, a single security tag wherein each security element responds to a different interrogator/reader system. Such a security element may be known as a dual EAS-RFID tag. For example, it may be desirable to read the RFID element of a tag attached to an article for inventory purposes while also having the capability to interrogate the EAS element if the tagged article should be removed from a store exit without having been purchased. Commonly-owned U.S. Pat. No. 8,026,818 entitled "EAS and UHF Combination Tag" provides examples of tags comprising both an EAS and an RFID element, e.g., dual EAS-RFID tags. This reference is incorporated by reference herein.

While dual EAS-RFID tags exist, they are typically large. Previous attempts to reduce the size of dual RFID-EAS tags have resulted in performance being compromised such that, at longer distances, the tag can be read within only a narrow band of frequencies. Thus, there exists a need for a dual EAS-RFID tag that is small in size without sacrificing the performance of the RFID or EAS element.

BRIEF SUMMARY

The present invention is directed to a tag comprising an EAS element and an RFID element. In one embodiment, the invention can be a security tag comprising a substrate comprising a first surface and a second surface opposite the first surface; an electronic article surveillance (EAS) element comprising an EAS antenna, the EAS antenna on the first surface of the substrate; and a radio frequency identification (RFID) element, the RFID element comprising: a far field antenna on the second surface of the substrate, the far field antenna comprising a first pole portion, a second pole portion, and a connecting portion connecting the first pole portion and the second pole portion; a near field loop antenna on the second surface of the substrate, and an integrated circuit operably coupled to the near field loop antenna; wherein the far field antenna, the near field loop antenna, and the EAS element are located on the substrate so as to be physically isolated from one another.

In another embodiment, the invention can be a security tag comprising a substrate; an EAS element on the substrate; and an RFID element on the substrate, the RFID element comprising (a) a far field antenna, (b) a near field loop antenna, and (c) an integrated circuit operably coupled to the near field loop antenna; wherein the far field antenna, the near field loop antenna, and the EAS element are located on the substrate so as to be physically isolated from one another.

In another embodiment, the invention can be a security tag comprising a substrate; an EAS element on the substrate; and an RFID element on the substrate, the RFID element comprising (a) a far field antenna, (b) a near field loop antenna, and (c) an integrated circuit operably coupled to the near field loop antenna; wherein the far field antenna and the near field loop antenna are located on the substrate so as to be physically isolated from one another; wherein a separator portion of the far field antenna is located between the near field loop antenna and the EAS element; and wherein the EAS element is located between the first and second pole portions of the far field antenna.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a first embodiment of a dual EAS-RFID tag.

FIG. 3 is a cross-sectional view of the first embodiment taken along line III of FIG. 2.

FIG. 4A is an alternative embodiment of a dual EAS-RFID tag.

FIG. 4B is an alternative embodiment of a dual EAS-RFID tag.

FIG. 4C is an alternative embodiment of a dual EAS-RFID tag.

FIG. 4D is an alternative embodiment of a dual EAS-RFID tag.

FIG. 5 is an alternative embodiment of a dual EAS-RFID tag in which the far field antenna is located on the top surface of a substrate and the near field loop antenna is located on the bottom surface of the substrate.

FIG. 6 is a cross-sectional view of the alternative embodiment taken along line VI of FIG. 5.

FIG. 8 is another alternative embodiment of a dual EAS-RFID tag in which the near field loop antenna is located on the top surface of a substrate and the far field antenna is located on the bottom surface of the substrate.

FIG. 9 is a cross-sectional view of the alternative embodiment taken along line IX of FIG. 8.

FIG. 10 is another alternative embodiment of a dual EAS-RFID tag in which the near field loop antenna and the far field antenna are located on the bottom surface of the substrate.

FIG. 11 is a cross-sectional view of the alternative embodiment taken along line XI of FIG. 10.

DETAILED DESCRIPTION

Figure 1:
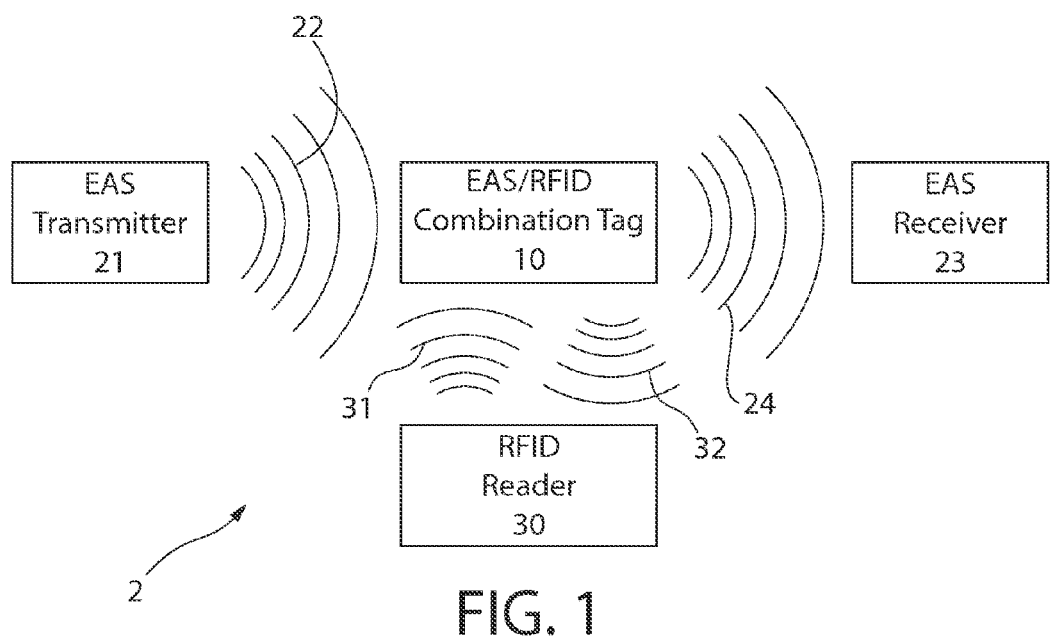
FIG. 1 is a transmitter/receiver system for a dual EAS-RFID tag.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

FIG. 1 is a transmitter/receiver system 2 for a combination (dual) EAS-RFID tag 10. The system 2 comprises an EAS transmitter 21 and an EAS receiver 23, which collectively comprise an EAS interrogator. Although transmitter 21 and receiver 23 are shown as separate devices, it should be understood that these devices may arise in many form factors, e.g., transmitter 21 and receiver 23 may be a single device. In the exemplified embodiment, the EAS transmitter 21 emits an EAS interrogator signal 22 and the EAS element 200 responds to the tuned frequency by transmitting an EAS response signal 24 to the EAS receiver 23. Further, when the RFID reader 30 transmits an RFID reader signal 31, the RFID element 300 may transmit or reflect an RFID response signal 32 to the RFID reader 30. Thus, the dual tag 10 is capable of receiving and responding to signals from both an EAS interrogator (transmitter 21, receiver 23) and an RFID reader 30.

FIGS. 2 and 3 show one embodiment of the dual tag 10. The tag 10 includes an EAS element 200 and an RFID element 300 supported on a substrate 100. The substrate 100 has a first surface 110 and a second surface 120 opposite the first surface 110. The EAS element 200 and the RFID element 300 may be secured to the first surface 110 of the substrate 100. The substrate 100 can comprise a sheet-like carrier material to which the EAS element 200 and RFID element 300 can releasably secure. In one embodiment, the substrate may be made of plastic. However, the substrate may be made of any material that can be used to hold the EAS and RFID elements. For example, in alternative embodiments, the substrate 100 can comprise any object to which the EAS and RFID elements can secure, including cardboard, a box, fabric, or a product housing. Further, portions of the RFID element 300 can be located on the second surface 120 of the substrate 100, as will be described below.

In the exemplified embodiment of FIG. 2, the EAS element 200 is a radio frequency (RF) resonant circuit formed of an electrically coupled capacitor and a multi-turn coil antenna (EAS antenna) 250. In this embodiment, the EAS antenna 250 is located on the first surface 110 of the substrate 100. Further, the EAS capacitor comprises a front capacitor plate 270a on the first surface 110 of the substrate 100 and second capacitor plate 270b on the second surface 120 of the substrate 100. The capacitor plates 270a, 270b of FIG. 2 are unfolded. In other embodiments, however, one or both of the capacitor plates 270 can be folded in any manner suitable for EAS performance. For example, second capacitor plate 270b can be configured to fold along a joint in the narrow arm of the second capacitor plate 270b such that the second capacitor plate 270b folds over the EAS antenna 250. In this embodiment, the EAS element 200 may be tuned to approximately an 8.2 MHz frequency range and responds to an EAS interrogator signal 22 from an EAS transmitter 21 with a characteristic EAS response signal 24.

As shown in FIG. 2, the EAS element 200 is substantially square-shaped with four edges, including an uppermost edge 210. As will be described below, in alternative embodiments the EAS element can take different shapes. Commonly-owned U.S. Pat. No. 8,125,341 entitled "Resonant Tag with Reinforced Deactivation Dimple" describes a common RF resonant tag. This reference is incorporated by reference herein. The invention, however, is not limited RF EAS systems. The EAS element 200 can comprise any type of wireless interrogation technology, including acousto-magnetic (AM) and electromagnetic (EM) technologies. Further, the EAS element 200 can be tuned to any frequency range.

FIG. 2 further shows the RFID element 300 comprising a far field antenna 310, a near field loop antenna 350, and an RFID integrated circuit (IC) 390 that may be electrically coupled to the near field loop antenna 350. The far field antenna 310 and near field loop antenna 350 comprise a conductive material. The RFID elements 310, 350 may be tuned to a frequency of 13.56 MHz or higher. As the frequency increases, the distance at which a tag can be detected (also referred to as a read distance) may also increase.

The RFID element 300 receives an RFID reader signal 31 from an RFID reader 30 and transmits or reflects an RFID response signal 32 to the RFID reader 30. In the exemplified embodiment of FIG. 2, the RFID element 300 uses passive RFID technology, and the RFID response signal 32 is generated using modulated backscatter technology. Thus, in this embodiment, the RFID element 300 can convert the energy received from the RFID reader signal 31 into electricity that can power the IC 390. Providing power to IC 390 enables the RFID element 300 to send data stored on the IC 390 to the RFID reader 30. In other embodiments, the invention can utilize alternative RFID technologies, such as semi-passive and active RFID (e.g., battery-assisted RFID elements).

In the exemplified embodiment of FIG. 2, the far field antenna 310 is a dipole antenna comprising a first pole portion 320, a second pole portion 330, and a connecting portion 340 connecting the first pole portion 320 and the second pole portion 330. In this embodiment, the first pole portion 320, second pole portion 330, and connecting portion 340 collectively form a substantially U shape. In alternative embodiments, however, the far field antenna 310 can take other shapes sufficient to accommodate the far field response.

As shown in FIG. 2, the EAS element 200 may be located between the first and second pole portions 320, 330 of the far field antenna 310. In the exemplified embodiment, the spacing between the EAS element 200 and the far field antenna 310 is small, e.g., 1.5 mm or smaller. The small spacing may be accomplished by etching the two elements (EAS and RFID) on the same substrate 100.

As can be seen from FIG. 2, the far field antenna 310, near field loop antenna 350, and EAS antenna 250 are located on the substrate 100. As shown in FIG. 2, the EAS element 200 and antennas 310, 350 may be arranged such that they are physically isolated from one another. Arranging the elements in such a manner may result in increased performance of the dual tag 10. Further, each of the EAS antenna 250, the far field antenna 310, and the near field loop antenna 350 may be circumscribed entirely by an exposed surface of the substrate 100.

The connecting portion 340 of the far field antenna 310 comprises a separator portion 341 located between the near field loop antenna 350 and the EAS element 200. Configuring the far field antenna 310, near field loop antenna 350, and EAS antenna 250, as described, will result in improved performance at a minimum footprint. By increasing the distance between the near field loop antenna 350 and the EAS element 200, performance of the tag 10 may be improved, because inductive coupling between the near field loop antenna 350 and EAS element 200 is reduced. Strong inductive coupling between the near field loop antenna 350 and the EAS element 200 increases the inductance of the overall RFID element 300, which results in an increase in the RFID element's 300 Q value.

Q is defined as the "quality factor" and is a measure of frequency selectivity or sharpness of the peak of an antenna circuit and is mathematically defined as:

$$Q = f_{cf} \div BW$$

where $f_{cf}$ is the center frequency or RFID reader 30 transmitter frequency and BW is the band of frequencies around the center frequency at which the response is no greater than 3 dB down from the center frequency of the RFID reader 30 antenna circuit. Q is also considered a measure of energy stored vs. energy dissipated at the resonant frequency, or in other words:

$$Q = \omega_0 \cdot \frac{L}{R}$$

where $\omega_0$ is the resonant radian frequency of the antenna circuit and L and R are the inductance and resistance of the antenna circuit. It should be understood that the L and R are by way of example only and that other antenna circuit configurations can be used where Q is also defined in terms of capacitance (C), resistance (R) and/or inductance (L).

By the antenna arrangement of the exemplified dual tag 10, overall coupling is decreased, resulting in an increased Q and an increased bandwidth of the RFID element 310. As a result, the RFID antennas 310, 350 can achieve good impedance matching to the IC 390, which has capacitive complex impedance.

In alternative embodiments, the EAS element 200 and the far field antenna 310 can be connected (i.e., not physically isolated), provided that a sufficient distance is maintained between the EAS element 200 and the near field loop antenna 350. In such embodiments, the EAS element 200 and the far field antenna 310 can be made from the same conductive material. The EAS element 200 and the far field antenna 310 can be formed using etching or alternative methods.

The connecting portion 340 of the far field antenna 310 may also comprise a pocket 342. The pocket 342 allows the separator portion 341 of the far field antenna 310 to separate the EAS element 200 from the near field loop antenna 350 while also allowing the near field loop antenna 350 enough area on the substrate such that both small size and high performance can be achieved. In the embodiment shown in FIG. 2, the pocket 342 has one long edge and two short edges. The two short edges are perpendicular to the long edge and parallel to each other, thus creating a rectangular opening. In other embodiments, the pocket 342 can take any shape that provides an opening. As shown in FIG. 2, the entirety of the near field loop antenna 350 may be nested within the pocket 342. In other embodiments, however, only a portion of the near field loop antenna 350 may be nested within the pocket 342. The near field loop antenna 350 can be understood to nest within the pocket provided that any portion of the near field loop antenna 350 is located within the pocket 342 created by the far field antenna 310. In still other embodiments, the pocket 342 can be omitted. In yet other embodiments (discussed below), the far field antenna 310, and/or the near field loop antenna 350, can be placed on the second surface 120 of the substrate 100.

As FIG. 2 shows, the connecting portion 340 of the far field antenna 310 may further comprise (a) a first lower portion 343 extending transversely inward from the first pole portion 320; (b) a second lower portion 344 extending transversely inward from the second pole portion 330; (c) a first leg portion 345 extending longitudinally upward from the first lower portion 343 of the connecting portion 340; and (d) a second leg portion 346 extending longitudinally upward from the second lower portion 344 of the connecting portion 340. The separator portion 341 of the far field antenna 310 extends transversely between the first and second leg portions 345, 346. Further, the separator portion 341 is longitudinally spaced from each of the first and second lower portions 343, 344 of the connecting portion 340. In alternative embodiments, the connecting portion 340 can take a variety of shapes.

The dual tag 10 may be further described with regard to a reference square projected on the first surface 110 of the substrate 100, where the reference square has four portions: a first portion (left side), second portion (right side), third portion (bottom side), and fourth portion (top side). The first portion (left side) of the reference square is formed by the leftmost edge 322 of the first pole portion 320 of the far field antenna 310. The second portion (right side) of the reference square is formed by the rightmost edge 332 of the second pole portion 330 of the far field antenna 310. The third portion (bottom side) of the reference square is formed by the lowermost edge 352 of the near field loop antenna 350. The fourth portion (top side) of the reference square is formed by the uppermost edge 210 of the EAS element 200. The invention is not so limited, however, as the aforementioned components need not form a reference square. For example, the pole portions may extend above the uppermost edge 210 of the EAS element 200.

The near field loop antenna 350 of the exemplified embodiment is substantially rectangular. In alternative embodiments, however, the near field loop antenna 350 can take other forms sufficient to achieve sufficient RFID performance, e.g., a square, oval, circle, etc.

As indicated above, the near field loop antenna 350, far field antenna 310, and EAS element 200 may be physically isolated from each other. "Physically isolated," as understood herein, means that there is no physical contact between the elements. Thus, if the near field loop antenna 350, far field antenna 310, and EAS element 200 are physically isolated from one another, there is no physical contact between the near field loop antenna 350, far field antenna 310, and EAS element 200. Physically isolated does not require that the electromagnetic properties of the near field loop antenna 350, far field antenna 310, and EAS element 200 have no effect upon each other. For example, although the near field loop antenna 350 and the EAS element 200 of FIG. 2 are physically isolated from each other, there may be inductive coupling between the near field loop antenna 350 and the EAS element 200.

In the exemplified embodiment of FIG. 2, the near field loop antenna 350 comprises a lowermost edge 352 and an uppermost edge 354. As this embodiment shows, the uppermost edge 354 of the near field loop antenna 350 may be located adjacent to the separator portion 341 of the far field antenna 310. Further, the lowermost edge 352 of the near field loop antenna 350 is in transverse alignment with the first and second lower portions 343, 344 of the connecting portion 340 of the far field antenna 310. In alternative embodiments, however, the lowermost edge 352 of the near field loop antenna 350 is not in transverse alignment with the first and second lower portions 343, 344 of the connecting portion 340 of the far field antenna 310. For example, the lowermost edge 352 can be located lower than the first and second lower portions 343, 344 of the connecting portion 340.

The RFID IC 390 may be a microelectronic semiconductor device for carrying out the functions of the RFID element 300. As shown in FIG. 2, the IC 390 may be operably coupled to the near field loop antenna 350. The operable coupling of the IC 390 to the near field loop antenna 350 can be accomplished by electrically coupling contacts of the IC 390 to connection pads of the near field loop antenna 350. Such coupling can utilize conductive flanges that connect to the IC 390 contacts to form a chip strap that bridges the gap in the near field loop antenna 350. By non-limiting example, see U.S. Pat. No. 6,940,408 (Ferguson, et al.); U.S. Pat. No. 6,665,193 (Chung, et al.); U.S. Pat. No. 6,181,287 (Beigel); and U.S. Pat. No. 6,100,804 (Brady, et al.), as well as U.S. Pat. No. 7,646,305 (Cote, et al.), and all of which are incorporated by reference herein. In alternative embodiments, the operable coupling of the IC 390 and near field loop antenna 350 can be accomplished by any means sufficient to enable the IC 390 and the near field loop antenna 350 to communicate data.

FIG. 3 shows a cross-sectional view of the first embodiment taken along line III of FIG. 2. As with the other cross-sections provided herein, this view is not drawn to scale and only includes those elements helpful in understanding the invention. In this embodiment, the near field loop antenna 350, the far field antenna 310, and the EAS antenna 250 are positioned on a first surface 110 of the substrate 100. As described throughout this disclosure, however, the position of the elements is not limited to the configuration shown on FIG. 3.

Figure 4E:
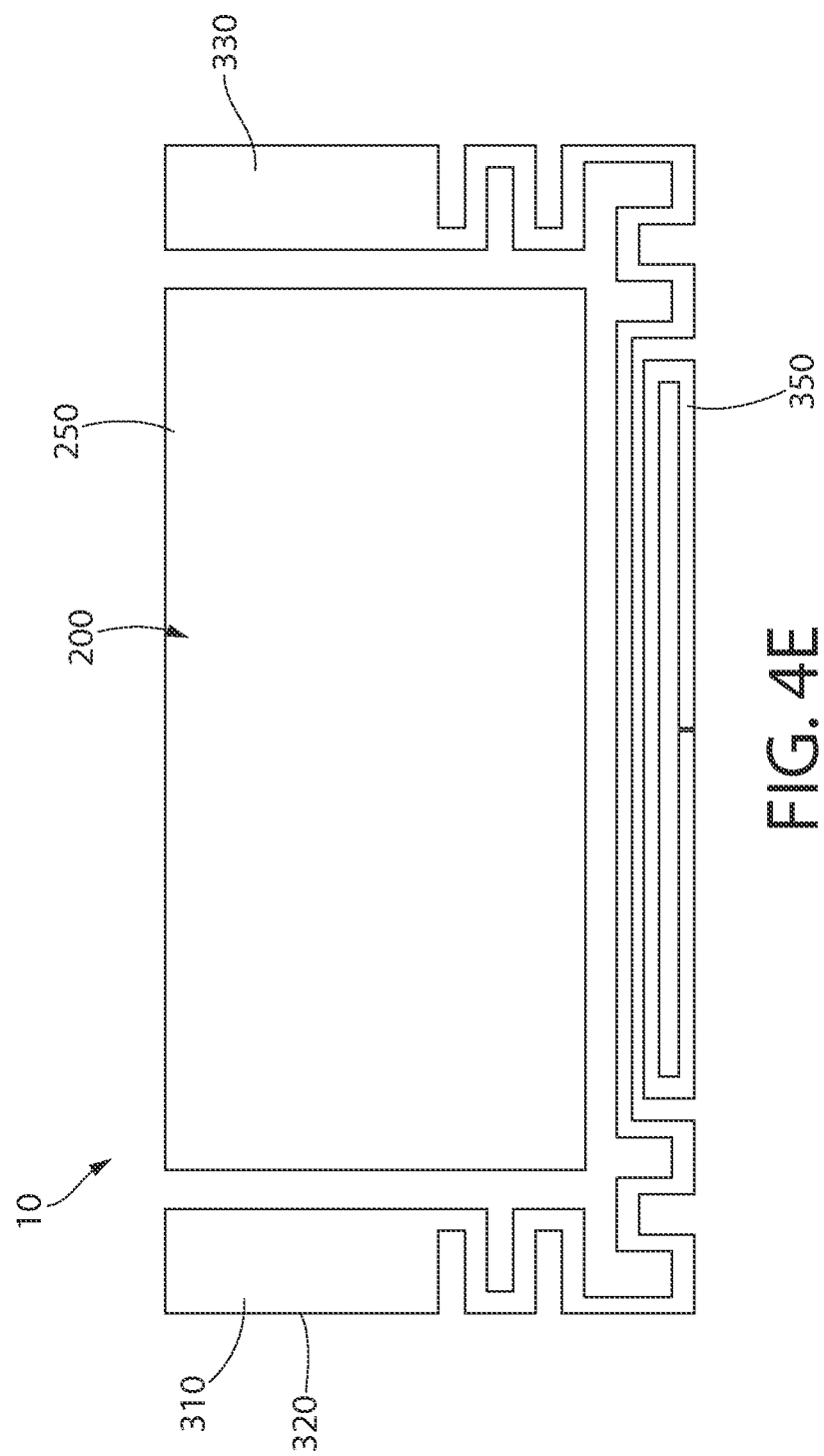
FIG. 4E is an alternative embodiment of a dual EAS-RFID tag.

FIGS. 4A-4E, for example, show alternative embodiments of the dual tag 10. The IC 390, the substrate 100, and details of the EAS element 200 are omitted from FIGS. 4A-4E to focus on the full shape of the near field loop antenna 350 and the far field antenna 310. These drawings show the differing shapes the antennas 310, 350 can take. FIG. 4A, for example, shows the near field loop antenna 350 shaped such that the IC 390 would connect on a left side of the near field loop antenna 350. FIG. 4B shows the far field antenna 310 shaped such that the first pole portion 320 and second pole portion 330 comprise a square wave shape. FIG. 4C shows the far field antenna 310 shaped such that the connecting portion 340 comprises a square wave shape.

FIGS. 4D and 4E show dual tags 10 longer in shape, i.e., as a rectangle. FIG. 4D comprises an EAS element 200 whose top and bottom sides are significantly longer that its left and right sides. Further, the far field antenna 310 depicted in FIG. 4D comprises large pole portions, including a thick end portion that bend back towards the middle portion. FIG. 4E includes pole portions that comprise a square wave shape.

FIGS. 5 and 6 show an alternative embodiment of a dual EAS-RFID tag 10. In this embodiment, the EAS antenna 250 and the far field antenna 310 are located on the first surface 110 of the substrate 100, while the near field loop antenna 350 is located on the second surface 120 of the substrate 100.

Positioning the near field loop antenna 350 and/or the far field antenna 310 on different surfaces of the substrate 100 provides design freedoms. These design freedoms may result, for example, in improvements for antenna impedance tuning By positioning the near field loop antenna 350 and the far field antenna 310 on different sides of substrate 100, for example, the near field loop antenna 350 and the far field antenna 310 can overlap while remaining physically isolated. Such positioning may result in a smaller footprint for the two antennas 310, 350, while retaining performance. In the exemplified embodiment, shown on FIG. 5, when viewed orthogonal to the first and second surfaces 110, 120, a portion of the near field loop antenna 350 overlaps the connecting portion 340 of the far field antenna 310. In alternative embodiments, however, the near field loop antenna 350 and the far field antenna 310 can be positioned such that they do not overlap.

In the exemplified embodiment, the EAS element 200 and the near field loop antenna 350 are positioned on the substrate 100 such that when viewed orthogonal to the first and second surfaces 110, 120, no portion of the near field loop antenna 350 overlaps the EAS element 200. In alternative embodiments, however, the near field loop antenna 350 may overlap the EAS element 200 when viewed orthogonally.

FIG. 6 is a cross-sectional view of the first embodiment taken along line VI of FIG. 5. As can be seen in FIG. 6, the EAS antenna 250 and the far field antenna 310 are located on the first surface 110 of the substrate 100, while the near field loop antenna 350 is located on the second surface 120 of the substrate 100.

Figure 7:
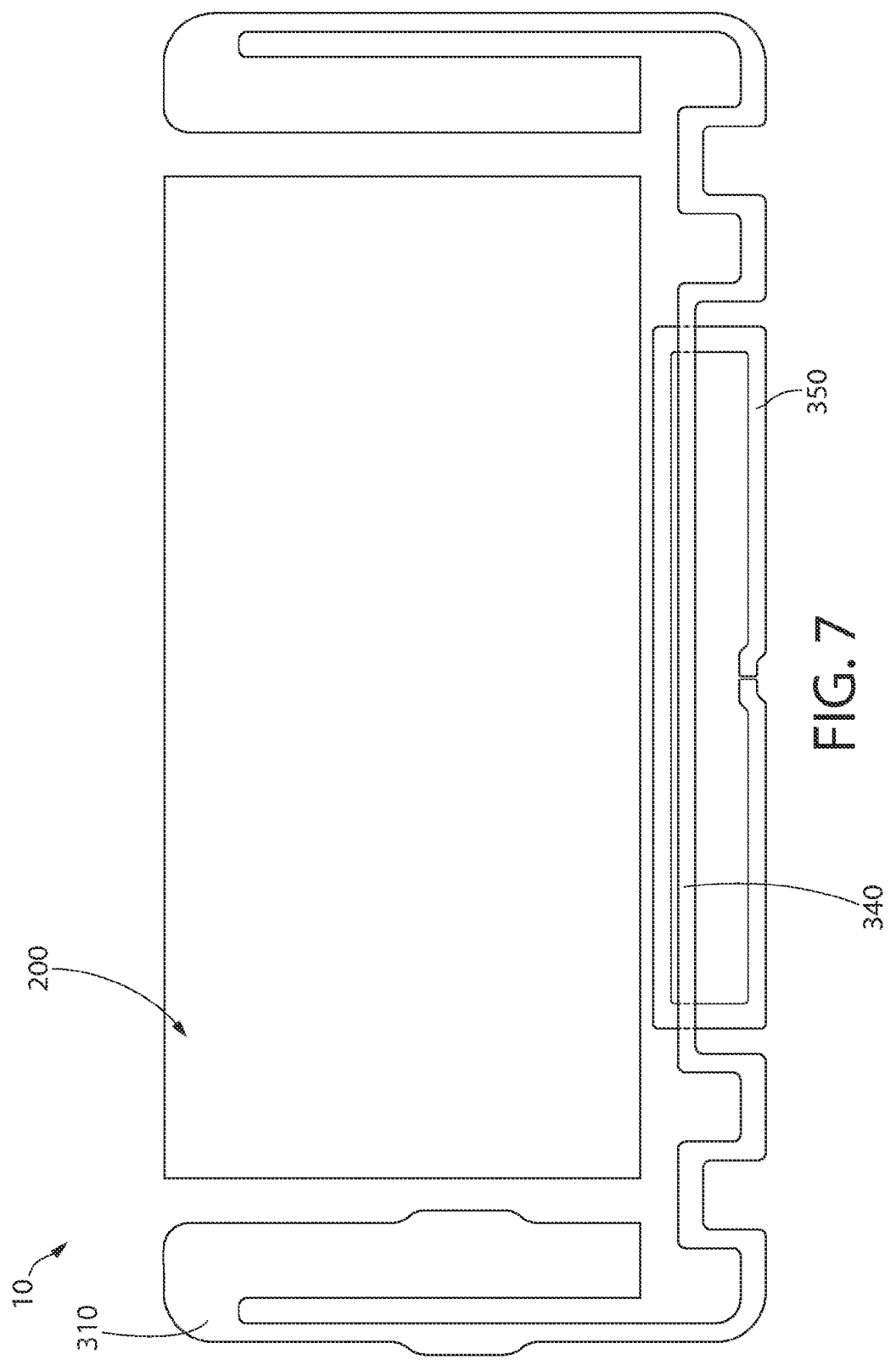
FIG. 7 is another alternative embodiment of a dual EAS-RFID tag in which the far field antenna is located above the near field loop antenna.

FIG. 7 is another alternative embodiment of a dual EAS-RFID tag 10, wherein the far field antenna 310 is positioned above the near field loop antenna 350. A substrate is not shown in FIG. 7, but, by this arrangement, one of ordinary skill should understand that the far field antenna 310 and the near field loop antenna 350 can be positioned on opposite sides 110, 120 of the substrate 100, e.g., to ensure that the antennas 310, 350 remained physically isolated. Similar to the embodiment shown in FIG. 5, a portion of the near field loop antenna 350 overlaps the connecting portion 340 of the far field antenna 310. In other embodiments, however, the near field loop antenna 350 may not overlap the connecting portion 340.

FIGS. 8-11 show two more embodiments of a dual EAS-RFID tag 10. In the embodiment of FIGS. 8-9, the EAS antenna 250 and the near field loop antenna 350 are located on the first surface 110 of the substrate 100, while the far field antenna 350 is located on the second surface 120 of the substrate 100. In the embodiment of FIGS. 10-11, the EAS antenna 250 is located on the first surface 110 of the substrate 100, while the far field antenna 350 and the near field loop antenna 350 are located on the second surface 120 of the substrate 100.

As discussed with regard to FIGS. 5-7, positioning the antennas 250, 310, 350 on different surfaces of the substrate 100 provides freedom for antenna design and impedance tuning. The antennas 250, 310, 350 can overlap while remaining physically isolated, thus resulting in a smaller footprint for the two antennas 310, 350. In the exemplified embodiment of FIGS. 8 and 9, for example, when viewed orthogonal to the first and second surfaces 110, 120, a portion of the near field loop antenna 350 overlaps the connecting portion 340 of the far field antenna 310. In alternative embodiments, such as the tag 10 shown in FIGS. 10 and 11, the near field loop antenna 350 and the far field antenna 310 can be positioned such that they do not overlap.

In the exemplified embodiments of FIGS. 8-11, the EAS element 200 and the far field antenna 310 are positioned on the substrate 100 such that when viewed orthogonal to the first and second surfaces 110, 120, no portion of the RFID antennas 310, 350 overlaps the EAS element 200. Such an arrangement helps avoid excessive inductive coupling between the RFID antennas 310, 350 and the EAS element 200. In alternative embodiments, however, the RFID antenna's 310, 350 may overlap the EAS element 200 when viewed orthogonally.

FIG. 9 is a cross-sectional view of the embodiment shown in FIG. 8 taken along line IX of FIG. 8. As can be seen, in this embodiment the EAS antenna 250 and the near field loop antenna 350 are located on the first surface 110 of the substrate 100, while the far field antenna 310 is located on the second surface 120 of the substrate 100. FIG. 11 is a cross-sectional view of the embodiment shown in FIG. 10 taken along line XI of FIG. 10. As can be seen, in this embodiment the EAS antenna 250 is located on the first surface 110 of the substrate 100, while the far field antenna 310 and the near field loop antenna 350 are located on the second surface 120 of the substrate 100. In alternative embodiments, any of the elements 200, 310, 350 can be located on any of the surfaces 110, 120 of the substrate 100.

Figure 12:
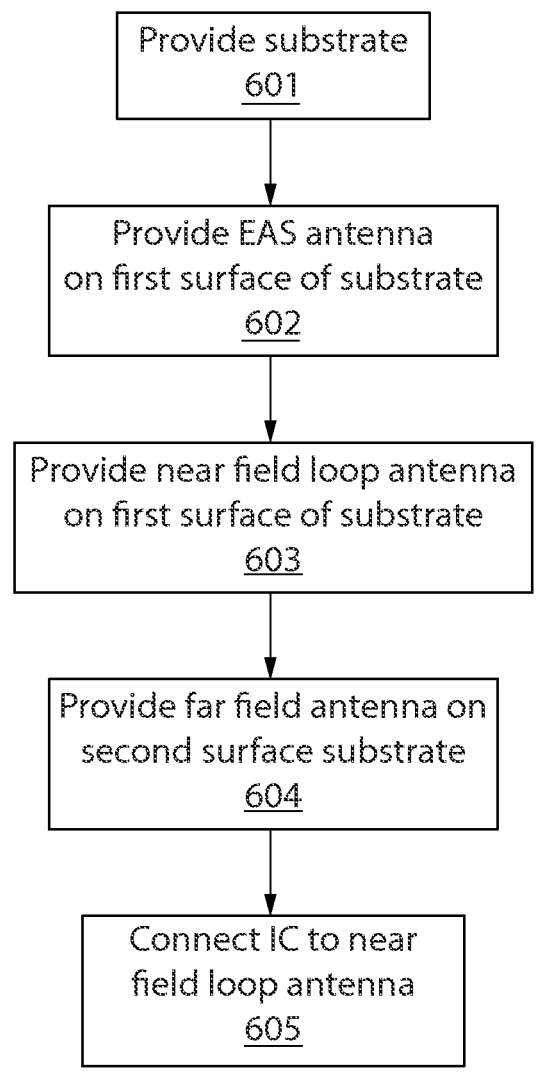
FIG. 12 is a flow chart for a method of manufacturing a dual EAS-RFID tag.

FIG. 12 depicts an example process for manufacturing the dual tag 10. The exemplified method comprises the following steps: providing a substrate 100 (step 601); providing an EAS antenna 250 on the first surface 110 of the substrate 100 (step 602); providing a near field loop antenna 350 on the first surface 110 of the substrate 100 (step 603); providing a far field antenna 310 on a second surface 120 of the substrate 100 (step 604); and connecting an IC 390 to the near field loop antenna 350 (step 605), wherein the far field antenna 310, near field loop antenna 350, and EAS element 200 are located on the substrate so as to by physically isolated from one another. In alternative embodiments, each of the EAS antenna 250, the near field loop antenna 350, and the far field antenna 310 can be on either of the surfaces 110, 120. For example, the tag 10 can be manufactured such that the EAS antenna 250 and RFID antennas 310, 350 may be provided on one side of the substrate. Further, the EAS antenna 250 and RFID antennas 310, 350 can be shaped and arranged as discussed above. The formation of the EAS element 200 and RFID antennas 310, 350 can be carried out by any process sufficient to produce operational EAS and RFID antennas, including a process by which the antennas are etched from a conductive sheet.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A security tag, comprising:
   a substrate comprising a first surface and a second surface opposite the first surface;
   an electronic article surveillance (EAS) element comprising an EAS antenna, the EAS antenna on the first surface of the substrate; and
   a radio frequency identification (RFID) element, the RFID element comprising:
   a far field antenna on the second surface of the substrate, the far field antenna comprising a first pole portion, a second pole portion, and a connecting portion connecting the first pole portion and the second pole portion;
   a near field loop antenna on the second surface of the substrate, and
   an integrated circuit operably coupled to the near field loop antenna;
   wherein the far field antenna, the near field loop antenna, and the EAS element are located on the substrate so as to be physically isolated from one another.

2. The tag of claim 1, wherein the EAS element is located between the first and second pole portions of the far field antenna.

3. The tag of claim 1, wherein each of the EAS antenna, the far field antenna and the near field loop antenna are circumscribed entirely by an exposed surface of the substrate.

4. A security tag, comprising:
   a substrate;
   an electronic article surveillance (EAS) element on the substrate; and
   a radio frequency identification (RFID) element on the substrate, the RFID element comprising (a) a far field antenna, (b) a near field loop antenna, and (c) an integrated circuit operably coupled to the near field loop antenna;
   wherein the far field antenna, the near field loop antenna, and the EAS element are located on the substrate so as to be physically isolated from one another.

5. The tag of claim 4, further comprising:
   the substrate comprising a first surface and a second surface opposite the first surface;
   the EAS element comprising an EAS antenna; and
   the EAS antenna, the far field antenna, and the near field loop antenna located on the first surface of the substrate.

6. The tag of claim 4, wherein a separator portion of the far field antenna is located between the near field loop antenna and the EAS element.

7. The tag of claim 6, further comprising:
   the far field antenna comprising a first pole portion, a second pole portion, and a connecting portion connecting the first pole portion and the second pole portion;
   the connecting portion of the far field antenna comprising the separator portion; and
   the EAS element located between the first and second pole portions.

8. The tag of claim 6, further comprising:
   the far field antenna comprising a first pole portion, a second pole portion, and a connecting portion connecting the first pole portion and the second pole portion;
   the connecting portion of the far field antenna comprising the separator portion;
   the connecting portion comprising a pocket; and
   at least a portion of the near field loop antenna nested within the pocket.

9. The tag of claim 8, wherein the entirety of the near field loop antenna is nested within the pocket.

10. The tag of claim 8, further comprising:
    the connecting portion further comprising:
    a first lower portion extending transversely inward from the first pole portion;
    a second lower portion extending transversely inward from the second pole portion;
    a first leg portion extending longitudinally upward from the first lower portion of the connecting portion;
    a second leg portion extending longitudinally upward from the second lower portion of the connecting portion; and the separator portion (a) extending transversely between the first and second leg portions and (b) longitudinally spaced from each of the first and second lower portions of the connecting portion.

11. The tag of claim 10, further comprising:
the near field loop antenna comprising a lowermost edge and an uppermost edge, the uppermost edge located adjacent the separator portion of the far field antenna; and
the lowermost edge of the near field loop antenna being in transverse alignment with the first and second lower portions of the connecting portion of the far field antenna.

12. The tag of claim 4, further comprising:
the far field antenna comprising a first pole portion, a second pole portion, and a connecting portion connecting the first pole portion and the second pole portion;
wherein the first pole portion, the second pole portion, and the connecting portion collectively form a substantially U shape.

13. The tag of claim 4, further comprising:
the substrate comprising a first surface and a second surface opposite the first surface;
the far field antenna comprising, a first pole portion, a second pole portion, and a connecting portion connecting the first pole portion and the second pole portion;
the connecting portion of the far field antenna comprising the separator portion;
the first pole portion comprising a leftmost edge that forms a first portion of a reference rectangle projected on the first surface of the substrate;
the second pole portion comprising a rightmost edge that forms a second portion of the reference rectangle; and
the near field loop antenna comprising a lowermost edge that forms a third portion of the reference rectangle.

14. The tag of claim 4, further comprising:
the substrate comprising a first surface and a second surface opposite the first surface;
the EAS element comprising an EAS antenna;
the EAS antenna and the near field loop antenna located on the first surface of the substrate; and
the far field antenna located on the second surface of the substrate.

15. The tag of claim 4, further comprising:
the substrate comprising a first surface and a second surface opposite the first surface;
the EAS element comprising an EAS antenna located on the first surface of the substrate; and
the far field antenna and the near field loop antenna located on the second surface of the substrate.

16. The tag of claim 14, further comprising:
the far field antenna comprising a first pole portion, a second pole portion, and a connecting portion connecting the first pole portion and the second pole portion;
wherein the near field loop antenna and the far field antenna are positioned on the substrate such that when viewed orthogonal to the first and second surfaces, at least a portion of the near field loop antenna overlaps the connecting portion of the far field antenna.

17. The tag of claim 4, wherein the EAS element comprises an EAS antenna; and wherein each of the EAS antenna, the far field antenna and the near field loop antenna are circumscribed entirely by an exposed surface of the substrate.

18. The tag of claim 4, wherein the EAS element comprises a resonant circuit formed of a capacitor and a coil antenna.

19. A security tag, comprising:
a substrate;
an electronic article surveillance (EAS) element on the substrate; and
a radio frequency identification (RFID) element on the substrate, the RFID element comprising (a) a far field antenna, (b) a near field loop antenna, and (c) an integrated circuit operably coupled to the near field loop antenna;
wherein the far field antenna and the near field loop antenna are located on the substrate so as to be physically isolated from one another;
wherein a separator portion of the far field antenna is located between the near field loop antenna and the EAS element; and
wherein the EAS element is located between the first and second pole portions of the far field antenna.

20. The tag of claim 19, further comprising:
the far field antenna comprising, a first pole portion, a second pole portion, and a connecting portion connecting the first pole portion and the second pole portion;
the connecting portion of the far field antenna comprising (a) the separator portion and (b) a pocket; and
at least a portion of the near field loop antenna nested within the pocket.

* * * * *